3,277,074
METHOD FOR THE PREPARATION OF POLY-
FUNCTIONAL DIAZONIUM HALIDES
Hartmut Steppan, Wiesbaden-Dotzheim, and August Rebenstock and Wilhelm Neugebauer, Wiesbaden-Biebrich, Germany, assignors, by mesne assignments, to Azoplate Corporation, Murray Hill, N.Y.
No Drawing. Filed July 5, 1962, Ser. No. 207,800
Claims priority, application Germany, July 8, 1961, K 44,203
16 Claims. (Cl. 260—141)

This application is a continuation-in-part of copending application Serial No. 124,805, filed July 18, 1961, now abandoned.

This invention relates to a method for the preparation of polyfunctional diazonium halides and, more particularly, to a method for the preparation of these compounds in which hydrofluoric acid, hydrochloric acid or hydrobromic acid is used as a condensation medium.

It is known to the art to prepare polyfunctional diazonium salts by condensing, in the presence of mineral acids, diphenylamine-4-diazonium salts with compounds containing carbonyl groups. In most cases, condensation has been effected with formaldehyde in a sulfuric acid condensation medium; however, hydrochloric acid has also been mentioned for this purpose. However, nothing is known of the properties of the condensation products prepared in concentrated hydrochloric acid other than that the products are soluble in water and alcohol.

The condensation products are usually isolated as metal halide double salts, primarily zinc chloride double salts. Isolation of these compounds in the form of diazonium sulfates is also known.

In accordance with the present invention, a method is provided for recovering the condensation products of either substituted or unsubstituted diphenylamine-4-diazonium salts with formaldehyde in which these condensation products, i.e. polyfunctional diazonium salts, are obtained as halides free of metal salts. In this method, unsubstituted or substituted diphenylamine-4-diazonium salts are condensed with formaldehyde or its polymers in hydrofluoric, hydrochloric or hydrobromic acid, and the reaction products obtained are isolated from the solutions of the condensation products, e.g. by evaporation of the solvent under vacuum at a temperature below 70° C., or by treatment of the raw condensation mixture with an organic solvent and subsequent filtering off and drying of the condensation product thus obtained.

Suitable substituents for the diphenylamine-4-diazonium salts of the present invention are, e.g., alkoxy groups, halogen groups, carboxyl groups, and alkyl groups standing in the 2-, 2'- 3-, 3'- and 4-positions of the diphenylamine nucleus. The alkoxy groups are especially useful. Alkoxy and alkyl groups having from 1 to 6, preferably from 1 to 4 carbon atoms, are considered as falling within the scope of the present invention.

Proceeding according to the method of the invention, the condensation products do not decompose and are obtained as yellow or reddish-brown to brownish green solids, which can be easily stored and shipped.

Condensation products of diphenylamine-4-diazonium salts with formaldehyde form, in the presence of excess acid, acid salts of the general formula $$ArN_2X \cdot HX$$

in which Ar is the condensed diphenylamine unit.

By evaporation of the hydrohalides from the condensation product mixture or other method of recovery, varied mixtures of acid and neutral diazonium halides or uniform acid diazonium halides are obtained, depending upon the acid used at the condensation medium, the temperature of evaporation, or other conditions prevailing during the isolation.

If the condensation of diphenylamine-4-diazonium chloride with formaldehyde is performed in the presence of an excess of concentrated hydrochloric acid, a product is obtained, upon evaporation of the solvent, which contains the neutral and acid salts of the condensation product in a molecular ratio of approximately 1:1. If, however, the bromide or the chloride of the 4-diazo-diphenylamine is condensed in concentrated hydrobromic acid, in each case upon evaporation of the solvent from the condensation product mixture, the acid bromide of the condensation product is obtained.

When diphenylamine-4-diazonium sulfate is condensed in concentrated hydrochloric acid, the chloride of the condensation product is best obtained by concentrating the mixture slightly, then diluting with a little water, and removing the sulfate ions in the form of a salt of low solubility, preferably as an alkaline earth salt. The residual solution is then evaporated to dryness.

The condensation is performed, preferably, in commercial concentrated hydrohalides, either at room temperature or at a slightly elevated temperature. Alternatively, condensation may be performed in highly concentrated acids, saturated while cold, thereby decreasing the reaction time or lowering the reaction temperature. Also, hydrohalides of lower concentration may be employed, thereby increasing the time of reaction. Because of the method of isolation of the condensation products, it is advantageous to operate with a concentration of diazo compound as high as possible. For example, good results are obtained when 1.5 to 2 ml. of concentrated hydrohalide are used per gram of diphenylamine-4-diazonium salt. Moreover, it is possible to use only from 1 to 2 moles of concentrated acid (e.g. 38 percent hydrochloric acid, 65 percent hydrobromic acid) per mole of diazonium salt. In this case, only a minimum evaporation of the solvent is necessary. Alternatively, particularly if a diphenylamine-4-diazonium chloride or diphenylamine-4-diazonium bromide in hydrobromic acd or a diphenylamine-4-diazonium bromide in hydrochloric acid are condensed and if the condensation is carried out in such a high concentration of the diazo compound in the acid as described above, it is advantageous to treat the reaction mixture, after the condensation reaction, with an organic solvent which readily dissolves water and hydrohalide acids, but in which the condensation product is insoluble or only difficulty soluble. Such solvents are, e.g., aliphatic alcohols with from 3 to 5 carbon atoms, such as propanol, isopropanol, butanol and isobutanol and aliphatic ketones such as acetone, methyl-ethyl-ketone, and mixtures thereof.

It may be of advantage to dilute the viscous raw condensate mass to two or three times its original volume by adding the desired quantity of an appropriate solvent, such as methanol or ethanol, dimethylformamide, dimethylsulfoxide, or mixtures of such solvents whereupon the solution thus obtained, which now has a low degree of viscosity, is treated with an excess of the solvent which causes the precipitation. The mixture is stirred for some time before the precipitate formed is drawn off and dried preferably in a vacuum at temperatures ranging from 20 to 50° C.

If the condensation products are recovered by precipitating with a solvent, it is advantageous to conduct the condensation reaction with a very low amount of acid. From 1 to 2 moles of a concentrated hydrohalide acid for each mole of diazonium salt are very useful for such a condensation. In such a case there is obtained a concentrated solution of the raw condensate in the hydrohalide acids, since only a minor amount of water is present and the best yields are obtained in the precipitation reaction.

In this way, the condensation product can be recovered in an especially pure form. In general, it will be obtained in the form of a mixture of acid and neutral halides of the condensation product.

Novel properties of the compounds obtained according to the method of the invention, which are free of metal salts, are their very high solubility in water and in a variety of organic solvents, as well as the fact that they do not decompose when stored. Thus, the diazonium salts prepared according to this invention afford, in many instances, appreciable advantages compared with the conventional zinc chloride double salts, the sulfates, and the diazo sulfonates of the condensation products obtained with sulfuric acid. The compounds are useful as dyestuff intermediates.

In the following, a number of diphenylamine-4-diazonium salts are stated, by way of example, which may be condensed with formaldehyde or its polymers in the presence of a hydrohalide acid and converted into polyfunctional diazonium halides according to the process of the present invention. It is, however, pointed out that the process of the present invention is by no means limited to the compounds stated:

diphenylamine-4-diazonium chloride,
diphenylamine-4-diazonium bromide,
diphenylamine-4-diazonium fluoride,
3-ethoxy-diphenylamine-4-diazonium chloride,
3-methoxy-diphenylamine-4-diazonium bromide,
3-ethoxy-diphenylamine-4-diazonium chloride,
3-ethoxy-diphenylamine-4-diazonium bromide,
2-methoxy-diphenylamine-4-diazonium chloride,
2-methoxy-diphenylamine-4-diazonium bromide,
2-methoxy-diphenylamine-4'-diazonium chloride,
2-ethoxy-diphenylamine-4'-diazonium chloride,
4-methoxy-diphenylamine-4'-diazonium chloride,
4-methoxy-diphenylamine-4'-diazonium sulfate,
3-methyl-diphenylamine-4-diazonium bromide,
3-methyl-diphenylamine-4'-diazonium chloride,
4-methyl-diphenylamine-4'-diazonium chloride,
3-methyl-6-methoxy-diphenylamine-4-diazonium chloride,
3,3'-dimethyl-diphenylamine-4'-diazonium chloride,
3-chloro-diphenylamine-4'-diazonium chloride,
diphenylamine-4-diazonium chloride-2'-carboxylic acid,
diphenylamine-4-diazonium chloride-2-carboxylic acid,
3-butyloxy-diphenylamine-4-diazonium chloride,
4-amyloxy-diphenylamine-4'-diazonium bromide,
2,5-diethoxy-diphenylamine-4-diazonium chloride,
4-methoxy-2'-ethoxy-diphenylamine-4'-diazonium chloride,
3-propyloxy-diphenylamine-4-diazonium chloride.

Exemplary of the polyfunctional diazonium halides which are prepared in accordance with the process of the present invention are:

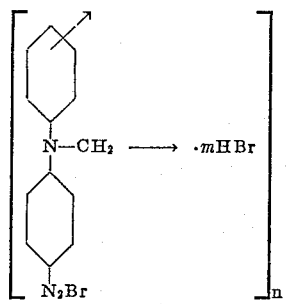

in which $n$ is an integer from 2 through 10 and $m$ is a number from 0 to 1;

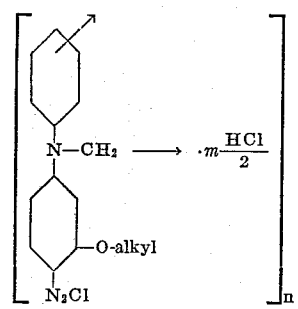

in which $n$ is an integer from 2 through 10, $m$ is a number from 0 to 1, and the alkoxy group has 1 to 6 carbon atoms;

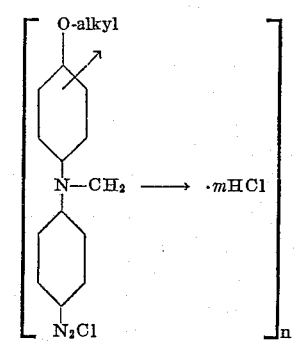

in which $n$ is an integer from 2 through 10, $m$ is a number from 0 to 1, and the alkoxy group has 1 to 6 carbon atoms;

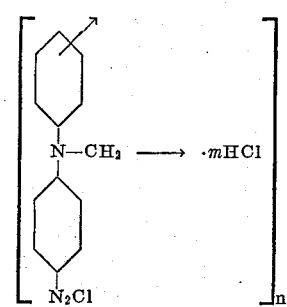

in which $n$ is an integer from 2 through 10 and $m$ is a number from 0 to 1, and

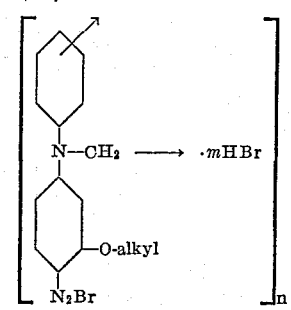

in which $n$ is an integer from 2 through 10, $m$ is a number from 0 to 1, and the alkoxy group has 1 to 6 carbon atoms.

The invention will be further illustrated by reference to the following specific examples.

*Example 1*

46 parts by weight of diphenylamine-4-diazonium chloride in 200 parts by volume of concentrated hydrochloric acid are mixed with 6 parts by weight of paraformaldehyde; the mixture is stirred, first for 8 hours at a temperature of 50° C., and then for 12 hours at room temperature. The mixture is then evaporated to complete dryness under vacuum, at a bath temperature between 50 and 55° C. The yield is 47 parts by weight of a product consisting of a mixture of equal parts of the neutral and the acid chloride of the condensation product.

*Example II*

138 parts by weight of diphenylamine-4-diazonium chloride and 18 parts by weight of paraformaldehyde are heated in 300 parts by volume of 66 percent hydrobromic acid for 7 hours at a temperature of 50° C. The mixture is then evaporated to dryness under vacuum, at a bath temperature of 60 to 70° C. The yield is 189 parts by weight of the acid bromide of the condensation product.

*Example III*

To 150 parts by volume of 48 percent hydrobromic acid, 6 parts by weight of paraformaldehyde and 55.2 parts by weight of diphenylamine-4-diazonium bromide are added, and the mixture is stirred for 21 hours at room temperature. The raw condensation product solution is then evaporated to dryness under vacuum at a temperature not exceeding 65° C. The yield is 72 parts by weight of the acid bromide of the condensation product.

*Example IV*

29.3 parts by weight of diphenylamine-4-diazonium sulfate are mixed with 3 parts by weight of paraformaldehyde, and added to 50 parts by volume of concentrated hydrochloric acid. The mixture is stirred for 7 hours at a temperature of 50° C., and 14 hours at room temperature. After the addition of 24.5 parts by weight of $BaCl_2 \cdot 2H_2O$, dissolved in 50 parts by volume of water, to the reaction mixture, the volume thereof is reduced by half by evaporation under vacuum, at a temperature of 60–65° C. The reaction mixture is then diluted with 50 parts by volume of water and, after separating the barium sulfate by centrifuging, the solution is evaporated to dryness under vacuum at a temperature of 60 to 65° C. The yield is 24.7 parts by weight of the mixture of the acid and the neutral chloride of the condensation product.

*Example V*

10.45 parts by weight of 3-methoxy-diphenylamine-4-diazonium chloride are mixed with 1.21 parts by weight of paraformaldehyde. The mixture is then added to 20 parts by volume of concentrated hydrochloric acid and stirred for one hour, at a temperature of 40° C., and 19 hours at room temperature. The reaction mixture is then evaporated to complete dryness under vacuum, at a temperature of 50° C. The yield is 11 parts by weight of a mixture of about equal parts of the acid and the neutral chloride of the condensation product.

*Example VI*

23.2 parts by weight of diphenylamine-4-diazonium chloride and 3.3 parts by weight of paraformaldehyde are heated in 50 parts by volume of 40 percent hydrofluoric acid, for 20 hours at a temperature of 40° C. and for 16 hours at a temperature of 50° C. The solution is then concentrated at a temperature of 50° C. by passing a stream of air over it, and finally it is completely dried under vacuum over potassium hydroxide. The yield is 20.5 parts by weight of a condensation product which contains approximately one fluoride and one chloride ion for each diazonium group.

*Example VII*

A mixture consisting of 10.45 parts by weight of 4-methoxydiphenylamine-4'-diazonium chloride and 1.21 parts by weight of paraformaldehyde is introduced into 20 parts by volume of concentrated hydrochloric acid. The solution is stirred, first for 7 hours at a temperature of 50° C. and then overnight at room temperature. The reaction mixture is then evaporated to complete dryness under vacuum, at a temperature of 60° C. The yield is 11.3 parts by weight of the condensation product, a chloride.

*Example VIII*

15 parts by weight of diphenylamine-4-diazonium-hydrogen fluoride (90 percent) are mixed with 1.9 parts by weight of paraformaldehyde. After adding 30 parts by volume of 40 percent hydrofluoric acid, condensation is effected by stirring the mixture, first for 22 hours at a temperature of 40° C. and then for 45 hours at a temperature of 50° C. The mixture is then concentrated at a temperature of 50° C. by passing a stream of air over it, and finally it is completely dried under vacuum over potassium hydroxide. The yield is 13 parts by weight of the condensation product, i.e. an acid fluoride.

*Example IX*

110.4 parts by weight of diphenylamine-4-diazonium-bromide are intimately mixed with 12 parts by weight of paraformaldehyde, and the mixture is introduced, over a period of 15 minutes, into 85.4 parts by weight of 64.5 percent hydrobromic acid. At the same time, heat is applied, so that addition is first performed at room temperature and then, when agitation becomes difficult, the temperature is raised to 50° C. and maintained at 50° C. until all of the mixture has been introduced. The reaction vessel is then closed, except for an opening to equalize pressure, and the reaction mixture is condensed for 7 hours at 50° C. while agitating.

To isolate the solid condensed halide, 20 parts by weight of the crude condensate are dissolved in 60 parts by volume of methanol, and the solution is then poured at room temperature into 500 parts by volume of isopropanol, while thoroughly stirring. Agitation is continued, while heating to 40 to 45° C., until the finely divided precipitate which has formed shows a tendency to deposit promptly, once the agitator is turned off. The precipitate is separated by suction filtration, washed with isopropanol, and dried at 20 to 50° C. under reduced pressure.

9.5 parts by weight are obtained of a mixture consisting of the neutral and acid bromides in a ratio of 60 to 40.

*Example X*

(a) 122 parts by weight of 3-methoxy-diphenylamine-4-diazonium-bromide (90 percent product) and 12 parts by weight of paraformaldehyde are intimately mixed and the mixture is then introduced, as described in Example IX, into 84.5 parts by weight of 64.5 percent hydrobromic acid over a period of 10 minutes. The reaction mixture is then condensed for 14 hours at a temperature of 50° C.

(b) 378 parts by weight of diphenylamine-4-diazonium chloride are intimately mixed with 45 parts by weight of paraformaldehyde and the mixture is then introduced, as described in Example IX, into 324 parts by weight of 64.5 percent hydrobromic acid over a period of 15 minutes. The reaction mixture is then condensed for 7 hours at a temperature of 50° C.

(c) 110.4 parts by weight of diphenylamine-4-diazonium bromide and 12.0 parts by weight of paraformaldehyde are intimately mixed and tightly compressed. Subsequently, 50.2 parts by weight of 64.5 percent hydrobromic acid are poured over the mass and the whole is heated to 50° C. During the next 30 minutes, the mixture is occasionally kneaded and then compressed again. After 45 minutes, the mixture has liquefied to such a degree that the agitator may be switched on and condensation may be completed by stirring for 7 hours at 50° C.

The reaction products resulting from the reactions under (a), (b) and (c) are obtained in the form of highly concentrated solutions. They are separated in each case by dissolving 30 parts by weight of the concentrated solution of the respective reaction product in 100 parts by volume of methanol and adding 800 parts by volume of butanol to the solution, while constantly stirring. A finely divided precipitate forms which is heated to a temperature of 50 to 55° C., while stirring is continued, until the precipitate rapidly deposits, when stirring is discontinued. The condensate is separated by suction filtration, washed with butanol, and then dried under reduced pressure at temperatures ranging from 20 to 50° C. In this manner, the condensation products are obtained in the form of easily flowing, pure substances.

It will be obvious to those skilled in the art that many modifications may be made within the scope of the present invention without departing from the spirit thereof, and the invention includes all such modifications.

What is claimed is:

1. A process for the preparation of a dry polyfunctional diazonium halide which comprises condensing formaldehyde with a sulfate of a diazonium base selected from the group consisting of diphenylamine-4-diazonium and substituted diphenylamine-4-diazonium in which the substituents are selected from the group consisting of alkyl and alkoxy groups having not in excess of six carbon atoms, chloride, bromide, and carboxyl groups, in solution in an acid selected from the group consisting of hydrofluoric, hydrochloric and hydrobromic acids, precipitating sulfate ions from the reaction solution and separating them therefrom in the form of an alkaline earth sulfate, and recovering the condensation product from the reaction solution by evaporating the reaction solution to dryness or precipitating the product from the reaction solution by the adition of at least one organic solvent selected from the group consisting of aliphatic alcohols having three to five carbon atoms and aliphatic ketones.

2. A process to claim 1 in which the condensation product is recovered by evaporating the reaction solution to dryness at a temperature below about 70° C.

3. A process according to claim 1 in which the diphenylamine-4-diazonium salt is a diphenylamine-4-diazonium halide.

4. A process according to claim 1 in which the diphenylamine-4-diazonium salt is a 3-alkoxy-diphenylamine-4-diazonium halide.

5. A process according to claim 1 in which the diphenylamine-4-diazonium salt is a 4-alkoxy-diphenylamine-4'-diazonium halide.

6. A process for the preparation of a dry polyfunctional diazonium halide which comprises condensing formaldehyde with a sulfate of a diazonium base selected from the group consisting of diphenylamine-4-diazonium and substituted diphenylamine-4-diazonium in which the substituents are selected from the group consisting of alkyl and alkoxy groups having not in excess of six carbon atoms, chlorine, bromine, and carboxyl groups, in solution in an acid selected from the group consisting of hydrofluoric, hydrochloric, and hydrobromic acids, precipitating sulfate ions from the reaction solution and separating them therefrom by the addition of barium chloride solution, and recovering the condensation product from the reaction solution by evaporating the reaction solution to dryness or precipitating the product from the reaction solution by the addition of at least one organic solvent selected from the group consisting of aliphatic alcohols having three to five carbon atoms and aliphatic ketones.

7. A process for the preparation of a dry polyfunctional diazonium halide which comprises condensing formaldehyde with a salt selected from the group consisting of a fluoride, chloride, and bromide of a diazonium base selected from the group consisting of diphenylamine-4-diazonium and substituted diphenylamine-4-diazonium in which the substituents are selected from the group consisting of alkyl and alkoxy groups having not in excess of six carbon atoms, chlorine, bromine and carboxyl groups, in solution in an acid selected from the group consisting of hydrofluoric, hydrochloric, and hydrobromic acids, and recovering the condensation product from the reaction solution by evaporating the reaction solution to dryness or precipitating the product from the reaction solution by the addition of at least one organic solvent selected from the group consisting of aliphatic alcohols having three to five carbon atoms and aliphatic ketones.

8. A process according to claim 7 in which the condensation product is recovered by evaporating the reaction solution to dryness at a temperature below about 70° C.

9. A process according to claim 7 in which the diphenylamine-4-diazonium salt is a diphenylamine-4-diazonium chloride.

10. A process according to claim 7 in which the diphenylamine-4-diazonium salt is a 3-alkoxy-diphenylamine-4-diazonium halide.

11. A process according to claim 7 in which the diphenylamine-4-diazonium salt is a 4-alkoxy-diphenylamine-4'-diazonium halide.

12. A compound having the formula

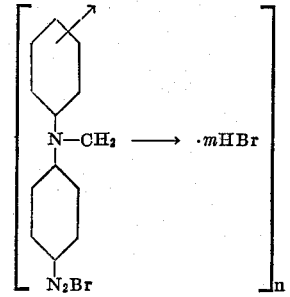

in which $n$ is an integer from 2 through 10 and $m$ is a number from 0 to 1.

13. A compound having the formula

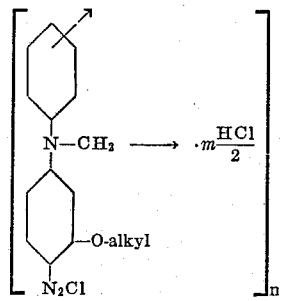

in which $n$ is an integer from 2 through 10, $m$ is a number from 0 to 1 and the alkoxy group has one to six carbon atoms.

14. A compound having the formula

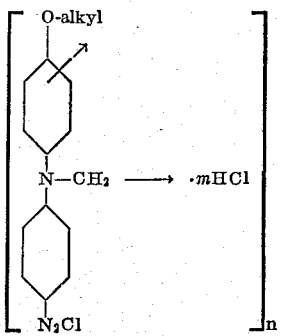

in which $n$ is an integer from 2 through 10, $m$ is a number from 0 to 1 and the alkoxy group has one to six carbon atoms.

15. A compound having the formula

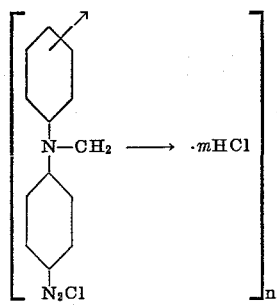

in which $n$ is an integer from 2 through 10 and $m$ is a number from 0 to 1.

16. A compound having the formula

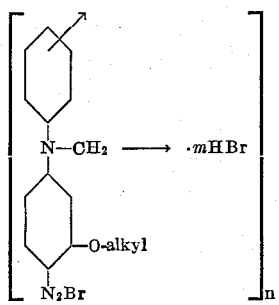

in which $n$ is an integer from 2 through 10, $m$ is a number from 0 to 1 and the alkoxy group has one to six carbon atoms.

References Cited by the Examiner

UNITED STATES PATENTS

| | | | |
|---|---|---|---|
| 2,060,573 | 11/1936 | Hester | 260—624 |
| 2,063,631 | 12/1936 | Schmidt et al. | 260—141 |
| 2,679,498 | 5/1954 | Seven et al. | 260—141 |
| 3,050,502 | 8/1962 | Mellan | 260—141 X |
| 3,163,633 | 12/1964 | Steppan et al. | 260—141 |

FOREIGN PATENTS

| | | |
|---|---|---|
| 139,851 | 12/1934 | Australia. |
| 604,278 | 10/1934 | Germany. |
| 220,025 | 7/1924 | Great Britain. |
| 418,011 | 10/1934 | Great Britain. |
| 168,142 | 6/1934 | Switzerland. |

OTHER REFERENCES

Saunders: The Aromatic Diazo Compounds, pages 8 and 41, 1949.

CHARLES B. PARKER, *Primary Examiner.*

NORMA S. MILESTONE, REYNOLD J. FINNEGAN, DONALD M. PAPUGA, *Assistant Examiners.*